(12) United States Patent
Foerster et al.

(10) Patent No.: US 11,416,207 B2
(45) Date of Patent: Aug. 16, 2022

(54) RESOLVING TIME-DELAYS USING GENERATIVE MODELS

(71) Applicant: DeepMind Technologies Limited, London (GB)

(72) Inventors: Jakob Nicolaus Foerster, San Francisco, CA (US); Ioannis Alexandros Assael, London (GB)

(73) Assignee: DeepMind Technologies Limited, London (GB)

( * ) Notice: Subject to any disclaimer, the term of this patent is extended or adjusted under 35 U.S.C. 154(b) by 696 days.

(21) Appl. No.: 16/428,370

(22) Filed: May 31, 2019

(65) Prior Publication Data

US 2019/0369946 A1 Dec. 5, 2019

(30) Foreign Application Priority Data

Jun. 1, 2018 (GR) ............................... 20180100238

(51) Int. Cl.
*G06F 3/16* (2006.01)
*G06N 3/04* (2006.01)
*G06N 3/08* (2006.01)

(52) U.S. Cl.
CPC ............. *G06F 3/162* (2013.01); *G06F 3/165* (2013.01); *G06N 3/04* (2013.01); *G06N 3/08* (2013.01)

(58) Field of Classification Search
CPC ...... G06N 3/0481; G06N 3/0454; G06N 3/08; G06F 3/165; G06F 40/274; G10L 15/0216; G10L 2015/025
See application file for complete search history.

(56) References Cited

U.S. PATENT DOCUMENTS

2017/0140753 A1* 5/2017 Jaitly ...................... G06F 40/55
2018/0210872 A1* 7/2018 Podmajersky .......... H04L 67/10

* cited by examiner

*Primary Examiner* — Priyank J Shah
(74) *Attorney, Agent, or Firm* — Fish & Richardson P.C.

(57) ABSTRACT

Methods, systems, and apparatus, including computer programs encoded on computer storage media, for generating audio output samples predicted to be communicated by a user. One example system includes a first user device having a first user. The first user device initiates a communication session between the first user and a second user of a second user device. The first user device obtains a neural network model of the second user. The neural network model is trained to generate, conditioned on audio input samples received up to a current time step, an audio output sample predicted to be communicated by the second user at a next time step. The user device repeatedly provides received audio input samples as input to the neural network model and plays audio output samples generated by the neural network model in place of received audio input samples communicated by the second user.

20 Claims, 5 Drawing Sheets

RESOLVING TIME-DELAYS USING GENERATIVE MODELS

BACKGROUND

This specification relates to technologies that use neural network models to predict and generate predicted audio output samples conditioned on past audio input samples.

Neural networks are machine learning models that employ multiple layers of operations to predict one or more outputs from one or more inputs. Neural networks typically include one or more hidden layers situated between an input layer and an output layer. The output of each layer is used as input to another layer, e.g., the next hidden layer or the output layer.

Each layer of a neural network specifies one or more transformation operations to be performed on input to the layer. Some neural network layers have operations that are referred to as neurons. Each neuron receives one or more inputs and generates an output that is received by another neural network layer. Often, each neuron receives inputs from other neurons, and each neuron provides an output to one or more other neurons.

An architecture of a neural network specifies what layers are included in the network, the properties of those layers, and how the neurons of each layer of the network are connected.

Each layer generates one or more outputs using the current values of a set of parameters for the layer. Training the network involves continually performing a forward pass on the input, computing gradient values, and updating the current values of the set of parameters for each layer. Once a neural network is trained, the final set of parameters can be used to make predictions in a production system.

SUMMARY

This specification relates to technologies that use neural network models to predict and generate audio output samples conditioned on past audio input samples.

In general, one innovative aspect of the subject matter described in this specification can be embodied in a system having a first user device configured to transmit audio data to and receive audio data from one or more other devices. The first user device is configured to initiate a communication session between a first user of the first user device and a second user of a second user device. The first user device obtains a neural network model of the second user. The neural network model is trained to repeatedly receive audio input samples of communication between the first user and the second user during the communication session and generate, conditioned on the audio input samples received up to a current time step, an audio output sample predicted to be communicated by the second user at a next time step. The first user device is configured to, during the communication session, repeatedly (i) provide received audio input samples as input to the neural network model and (ii) play audio output samples generated by the neural network model in place of received audio input samples communicated by the second user before the received audio input samples are ready to be played.

This specification uses the term "configured to" in connection with systems, apparatus, and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions. For special-purpose logic circuitry to be configured to perform particular operations or actions means that the circuitry has electronic logic that performs the operations or actions.

The subject matter described in this specification can be implemented so as to realize one or more of the following advantages. Synchronous communication between two or more people in different physical locations is difficult due to delay introduced by communication hardware, e.g., microphones, analog-to-digital converters, digital signal processors, network routers, and interconnect, during transmission of a communication signal from one person to another. Network bandwidth limitations can also introduce delay. The described system uses neural network models to generate a predicted audio output sample for a particular time step, play the generated audio output sample in place of a received audio input sample for the time step, and condition future predictions on past audio input samples. Because the system generates audio output samples locally, there is no time-delay associated with communication hardware, network bandwidth limitations, or even the maximum speed of propagation of a signal. The user device can play that predicted audio output sample while the corresponding audio input sample is still in transit from its source. This allows for pseudo-synchronous communication over long distances.

The details of one or more implementations of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Synchronous communication between two or more people in different physical locations is difficult due to constraints imposed by the speed of light. This is particularly true when the physical locations are very far apart. In telecommunications, the round-trip delay time ("RTD") is the length of time it takes for a signal to be sent plus the length of time it takes for an acknowledgment of that signal to be received. This time varies from 80 milliseconds to 200 milliseconds for intercontinental communications, making synchronous tasks like conference and video calls, band rehearsals, gaming, and collaborative surgeries challenging. Communication hardware that facilitates transmission of a communication signal from one user to another introduces delay that increases the total RTD of that signal. Network bandwidth limitations can also introduce delay. And even if hardware is optimized and network bandwidth is unlimited, the minimum RTD for a particular signal is the total distance the signal must travel divided by the speed of light, which is the maximum speed at which any signal can propagate.

This specification relates to technologies that overcome the challenges described above that are inherent in communicating on a telecommunications network over long distances. More specifically, this specification relates to a system that uses neural network models to generate a predicted audio output sample for a particular time step, play the generated audio output sample in place of a received audio input sample for the time step, and condition all future predictions on past audio input samples. Because the system generates predicted audio output samples locally and plays those predictions in place of received predictions, delays associated with long distance communications between two or more devices that are remote from one another are mitigated.

Figure 1:
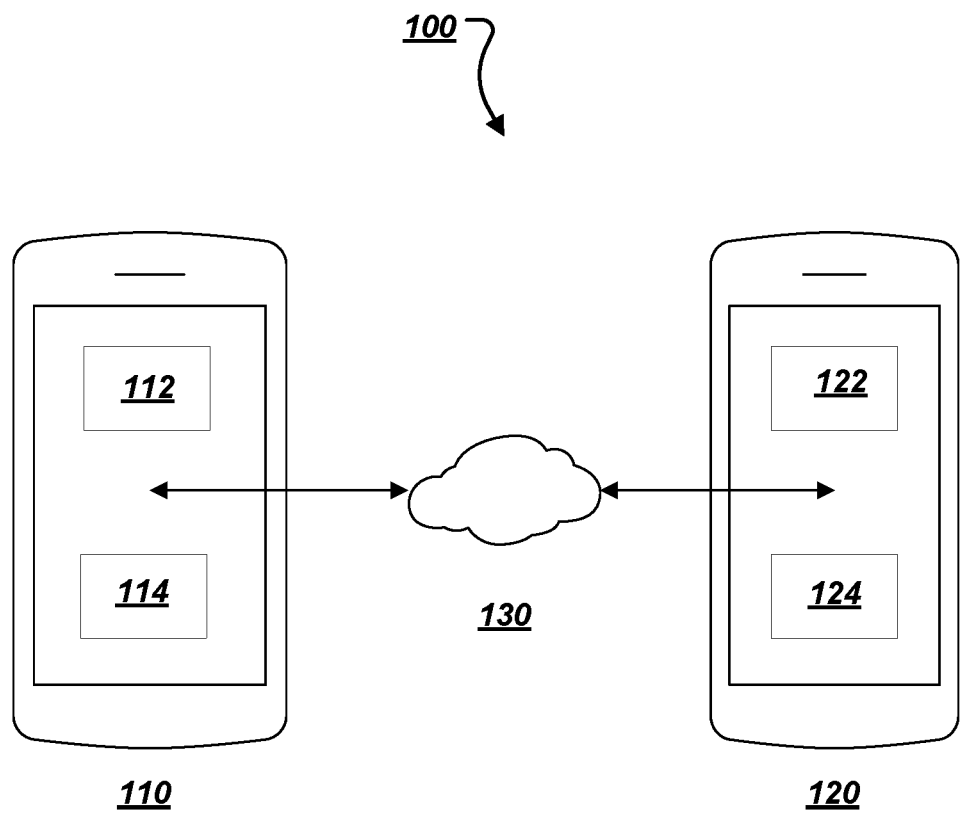
FIG. 1 is a diagram of an example communication system.

FIG. 1 is a diagram of an example communication system 100.

The communication system 100 includes two or more user devices, including a user device 110 and a user device 120. Although the user devices depicted in FIG. 1 are mobile devices, the user devices can also be desktop or laptop computers, tablets, gaming systems, conferencing systems, or any computing devices that are able to communicate with other devices on a network, i.e., to send and receive data over a data communication network.

The user devices each include an audio input device, e.g., a microphone, and an audio output device, e.g., a speaker, that receive and output audio, respectively. For example, the user device 110 includes an audio input device 112 and an audio output device 114. Each user device is configured to convert analog audio signals that it receives from the audio input device into digital audio signals that can be transmitted over a digital network. Each user device is also configured to convert digital audio signals that it receives from other user devices on the network into analog audio signals. Fragments of audio data received by an audio input device, e.g., a microphone, at either user device are "audio input samples." Audio input samples are actual communications made by, e.g., spoken by, sung by, etc., users of the user devices.

Applications that run on the user devices can cause two or more of the user devices to initiate a communication session with each other. The application can be a stand-alone app, a JavaScript program running in a web browser installed on the user device, or a web page implemented in a markup language and displayed on the web browser. Example applications include video conferencing applications, VOID applications, multi-player online video games that allow communication between players, and other applications that facilitate communication between devices on a network.

Each user device is also configured to obtain and store a neural network model of one or more other users. The neural network model can be trained on communications between the modeled user and the user that locally implements the neural network model, or on communications between the modeled user and multiple other users or persons. The neural network model can also be trained on a corpus of generic communications, e.g., on a corpus of communications between people not including the person to be modeled. In such implementations, the neural network model can be conditioned on a context vector for the person to be modeled. A particular user device can store the parameters of a neural network model in memory on the user device. The architecture of the neural network will be described in more detail in reference to FIGS. 3-5.

Each neural network model is trained to repeatedly generate predicted audio output samples of a particular user during communication sessions between that user and other users. Each prediction is conditioned on past audio input samples during the communication session. The past audio input samples are actual communications between the users participating in the communication session, and not predictions made by a neural network model. For example, the users might engage in a spoken conversation during the communication session. The parts of that spoken conversation make up the past audio input signals.

The particular user device implementing the neural network model plays the generated audio output samples in place of the audio input samples, i.e., in place of actual communications made by the user that is modeled by the neural network model. The particular user device implementing the neural network model does not play the audio input samples it receives, except in rare circumstances when the neural network model makes incorrect predictions. In other words, the user of the user device implementing the neural network model generally communicates only with the neural network model of one or more other users, and not with those users themselves. Because the neural network model generates audio output samples locally, there is no time-delay associated with the speed of light. In other words, the user device can play a predicted audio output sample for a particular time step before the user device even receives an audio input sample for that time step, or before the audio input sample for that time step is ready to be played, for example, because it is still being processed.

A network 130 connects the user devices using wired connections, wireless connections, or both. For example, the network 130 can include telephone circuits, coaxial cables, fiber optic cables, and Wi-Fi, satellite, or cellular network technology. The network 130 can be a local area network (LAN) that connects user devices in a limited area like a residence, school, laboratory, or office building. LANs include Ethernet and Wi-Fi networks. The network 130 can also be a larger network, including a wide area network (WAN) or the Internet.

Communication software, e.g., an application, installed on the user device 120 can cause the user device 120 to perform the operations described above. For example, in response to a selection in a user interface of an application, the application can cause the user device 120 to switch from a conventional communication session to a communication session that uses neural network models as described above. In other implementations, an operating system of the user device 120 directly modifies a conventional communication session.

Figure 2:
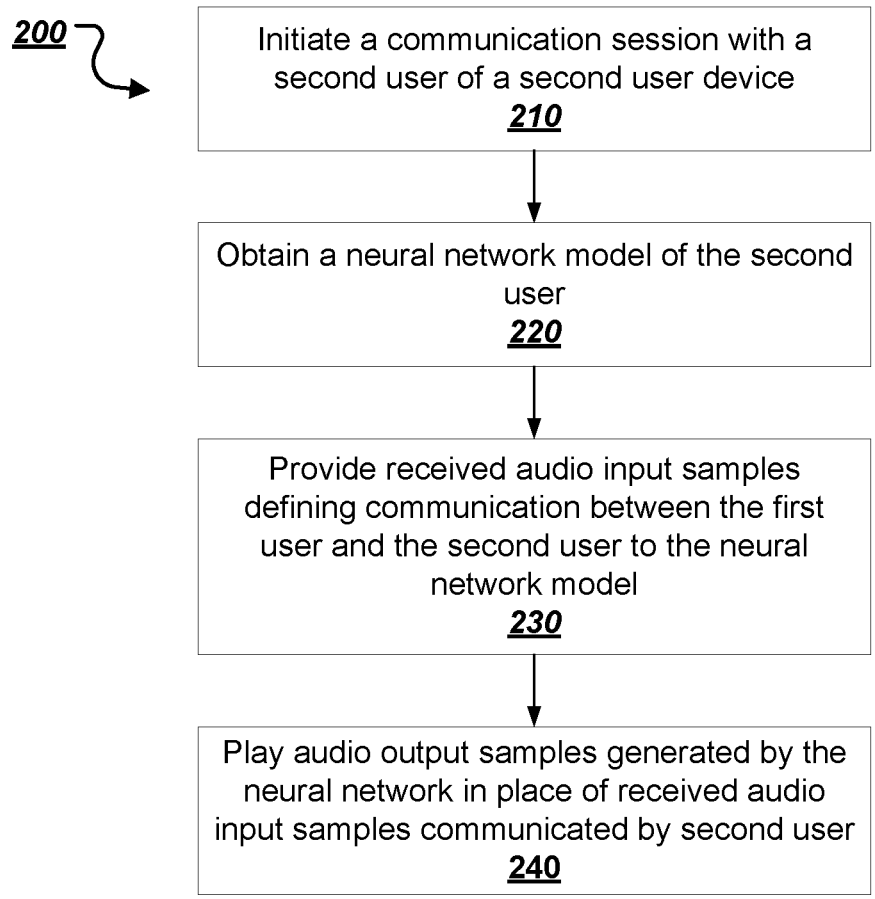
FIG. 2 is a flow chart of an example process for generating predicted audio output samples.

FIG. 2 is a flow chart of an example process for generating audio outputs samples predicted to be communicated by a user of a user device. For convenience, the process 200 will be described as being performed by a first user device, e.g., the user device 110 in the communication system 100 of FIG. 1.

First, the first user device initiates a communication session between its own user ("a first user") and a second user of a second user device (210). As described above, the communication session can be initiated through a particular application running on both user devices. Each user device is configured to transmit audio data to and receive audio from one or more other user devices.

Next, the user device obtains a neural network model of the second user (220). The user device can obtain the neural network model directly from the second user, or it can obtain the neural network model from a separate location. For example, the user device can obtain the neural network model from a central database that stores neural network models of a number of different users.

Neural network models are machine learning models that employ one or more layers of nonlinear units to predict an output for a received input. Some neural networks models include one or more hidden layers in addition to an output layer. The output of each hidden layer is used as input to one or more other layers, e.g., another hidden layer or the output layer. Each layer of the network generates an output from a received input in accordance with current values of a respective set of parameters. Thus, to obtain a neural network model of the second user, the user device obtains the architecture of the model and the current values of the respective set of parameters that make up the model. After it obtains the values, the user device stores those values in local memory. In some other implementations, the neural network model is trained locally on the device that implements it.

The user device repeatedly provides to the neural network model audio input samples defining communication between the first user and second user during the communication session as those audio input samples are received (230). For example, the first user and the second user might engage in a spoken conversation about a new television series. The user device can provide the spoken conversation as input to the neural network model. As another example, the first user and the second user might be members of a band participating in band rehearsal. The user device can provide the played music as input to the neural network model.

The neural network learns to generate, conditioned on the audio input samples received up to a current time step, an audio output sample predicted to be communicated by the second user at a next time step. Suppose, as mentioned above, that the first user and the second user are discussing a new television series:

First user: "What did you think of the first episode?"
Second user: "It started off a bit slow, but I loved the endin_!"

In this example, the neural network model must predict the next one or more amplitude values of audio data that the second user will speak after "endin . . . " at a time step T. The prediction is conditioned on previous audio input samples that the neural network model has received at prediction time, including "What did you think of the first episode?" and "It started off a bit slow, but I loved the endin . . . " In this case, the neural network model might predict that the next one or more amplitude values of audio data correspond to the phoneme "g." In other words, the full predicted word might be "ending."

The user device causes the neural network model to repeatedly make these predictions. In the example above, it will predict the amplitude value of audio data that the second user will speak after the phoneme "g," and it will predict every subsequent amplitude value of audio data after that too. Additionally, the neural network model previously predicted every amplitude value of audio data before the phoneme "g."

In some implementations, the neural network model generates a probability distribution over a set of possible audio output samples and selects an audio output sample corresponding to a highest probability in the distribution. For example, the neural network model might predict a first phoneme with 30% confidence, a second phoneme with 25% confidence, and a third phoneme with 45% confidence. The user device samples from the distribution such that the third phoneme is selected 45% of the time.

In other implementations, the neural network model generates a probability distribution over a set of possible audio output samples for particular time step, but the user device determines that none of the probabilities meet a predetermined threshold. In response, the user device waits to receive the audio input sample communicated by the second user at the time step and plays that audio input sample instead of an audio output sample generated by the neural network. At the next time step, the user device resumes playing the audio output samples generated by the neural network model.

In some cases, the neural network model may generate an incorrect audio output sample. The user device can determine if the neural network model generated an incorrect audio output sample for a particular time step by comparing the audio output sample to the audio input sample for that time step. If the neural network model determines that the two are different, the user device temporarily stops playing audio output samples. Instead, the user device plays the audio input sample corresponding to the incorrect audio output sample and all subsequent audio input samples that the user device has received. Because the average length of a phoneme in English is approximately 170 milliseconds, the user device can make this transition without the first user perceiving it. The user device can play the audio input samples at a faster speed than normal to "catch-up" to the neural network model's predictions. At subsequent time steps, the user device resumes playing audio output samples generated by the neural network model. Past incorrect predictions do not affect future predictions because future predictions are always based on audio input samples and not on audio output samples. In other words, current and future predictions are only based on actual communications between the users participating in the communication session, and not on past predictions that the neural network model made. This ensures that the neural network model does not get too far off track.

After the neural network model generates an audio output sample, the first user device plays that audio output sample in place of the actual, or received, audio input sample communicated by the second user (240). In other words, the user device does not play what the second user actually said at a particular time step, but instead what the neural network model predicts he or she will say at the time step. Because the user device generates the audio output samples locally and does not wait for corresponding audio input signals to arrive, the time-delay associated with long-distance communications is avoided. Once the user device receives the audio input samples, the user device provides those samples to the neural network model to condition future predictions.

Figure 3:
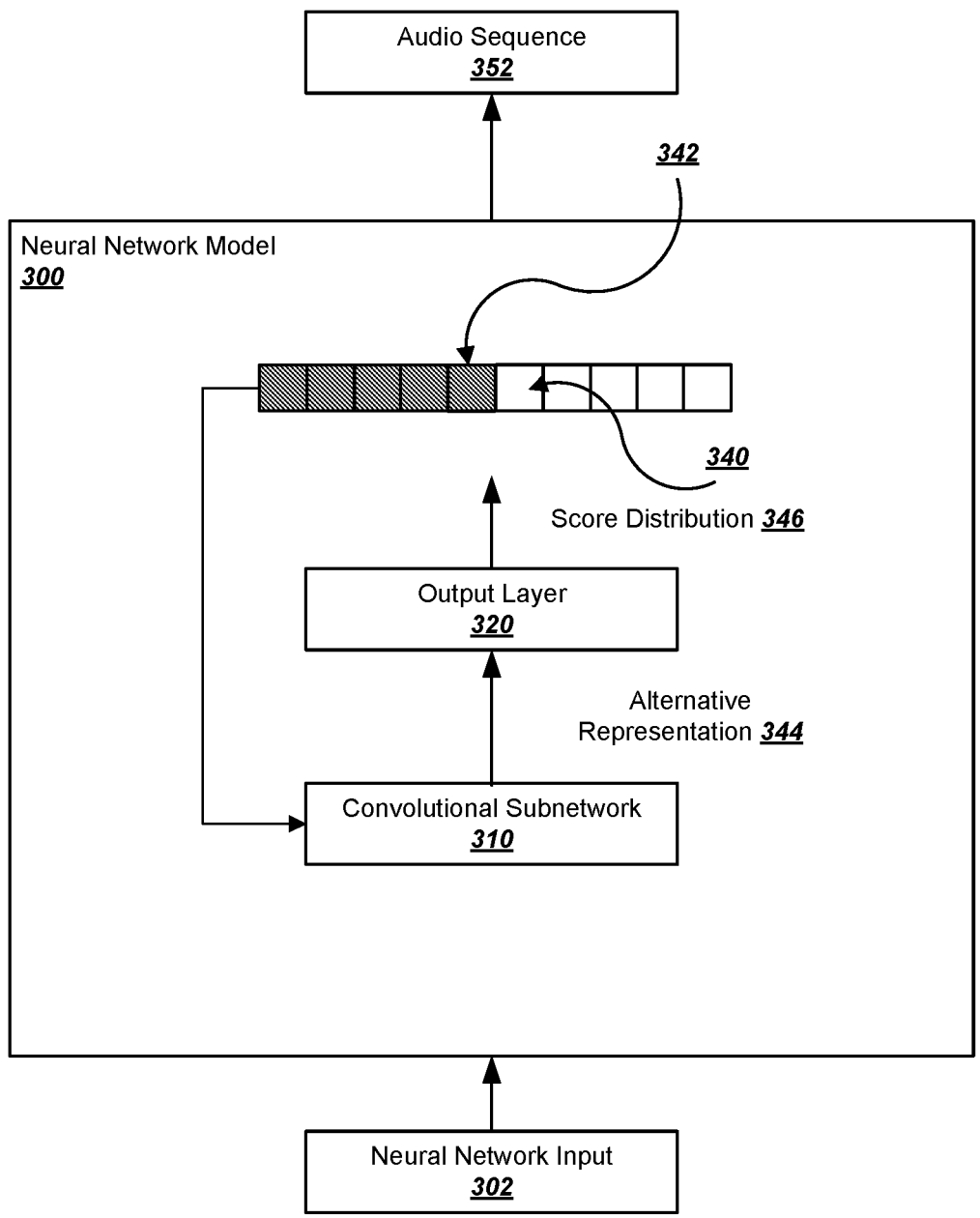
FIG. 3 is a diagram of an example neural network model.

FIG. 3 is a diagram of an example neural network model 300. The neural network model 300 is a neural network model of a particular user of a user device. A different user device obtains and implements that neural network model to generate audio output samples predicted to be communicated by the user on which the model is based during a communication session. As described below and depicted in FIG. 3, the neural network model 300 is a convolutional neural network model. However, the neural network model 300 can be any type of autoregressive neural network model.

The neural network model 300 generates an audio output sample at each of multiple time steps. The audio output samples form an audio output sequence 352. Generally, each time step in a given audio output sequence corresponds to a respective time in an audio waveform. The audio output sample at the time step characterizes the waveform at the corresponding time. In some implementations, the audio output sample at each time step in the audio output sequence is the amplitude of the audio waveform at the corresponding time, i.e., the audio output sequence generated by the neural network model 300 is a raw audio waveform. In some other implementations, the audio output sample at each time step in the sequence is a compressed or companded representation of the waveform at the corresponding time. For example, the audio output sample can be apt-law transformed representation of the waveform.

More specifically, the neural network model 300 generates audio output samples conditioned on audio input samples received from either of the two users mentioned above, or from other users participating in a communication session.

The neural network model 300 includes a convolutional subnetwork 310 and an output layer 320. At each time step during the generation of an audio output sequence, the convolutional subnetwork 310 is configured to receive audio input samples up to a current time step and process the audio input samples to generate an alternative representation 344 for the time step. For example, when generating an audio output sample 340 in the audio output sequence 352, the convolutional subnetwork 310 can receive a previous audio input sequence 342 that includes the audio input samples that the neural network model previously received. The previous audio input sequence 342 includes actual communications received by the neural network model 300 from any of the users during the communication session. In contrast, conventional autoregressive neural networks are conditioned on previous output samples, i.e., output samples that the model previously predicted.

The convolutional subnetwork 310 processes the previous audio input sequence 342 to generate an alternative representation 344. The alternative representation 344 can be a numeric representation, i.e., an ordered collection of numeric values, in which the audio input sequence has been encoded by the convolutional subnetwork, for example by encoding features of the audio input sequence.

The output layer 320 is configured to, at each of the time steps, receive the alternative representation 344 at the time step and generate a score distribution over possible audio output samples for the time step. The score distribution includes a respective score for each of multiple possible audio output samples. In some implementations, the output layer 320 is a softmax output layer. For example, the output layer 320 can receive the alternative representation 344 and process the alternative representation 344 to generate a score distribution 346.

In particular, when the neural network model 300 is configured to generate raw audio data, the score distribution includes a respective score for each of multiple possible amplitude values. When the neural network model 300 is configured to generate compressed or companded values, the score distribution includes a respective score for each of multiple possible compressed or companded values.

Once the output layer 346 has generated the score distribution for a given time step, the neural network model 300 can select an audio output sample to be included in the audio output sequence at the given time step from the multiple possible audio output samples in accordance with the score distribution for the given time step. For example, the neural network model 300 can select the audio output sample having the highest score according to the score distribution.

The convolutional subnetwork 310 generally includes multiple audio-processing convolutional neural network layers. More specifically, the audio-processing convolutional neural network layers include multiple causal convolutional layers.

A causal convolutional layer is a convolutional layer that operates on an input sequence that has a respective input at each of multiple time steps by, for each time step, generating an output that depends only on the inputs at the time step and at the time steps before the time step in the input sequence, i.e., and not on any inputs at any time steps after the time step in the input sequence. In some cases, the causal convolutional layers are implemented by applying a normal convolution and then shifting each output of the normal convolution by a few time steps, i.e., shifting each output forward by (filter length−1) time steps, prior to applying the activation function for the convolutional layer, where "filter length" is the length of the filter of the convolution that is being applied.

To increase the receptive field of the audio-processing convolutional layers without requiring an excessive number of layers or filters of excessive length, some or all of the audio-processing convolutional layers can be dilated causal convolutional layers. A dilated convolution is a convolution where the filter is applied over an area larger than its length by skipping input values with a certain step that is defined by the dilation value for the dilated convolution. By incorporating dilated causal convolutions, the audio processing neural network layers effectively operate on their inputs with a coarser scale than with a normal convolution.

In some implementations, the audio-processing neural network layers include a stack of multiple blocks of dilated causal convolutional layers. Each block in the stack can include multiple dilated convolutional neural network layers with increasing dilation. For example, within a block, the dilation can double for each layer starting from an initial dilation, and then return to the initial dilation for the first layer in the next block. As an illustrative example, the dilations of the dilated convolutional layers in a block can be, in order: 1, 2, 4, . . . , 512. A simplified example of a block of dilated causal convolutional layers is described below with reference to FIG. 4.

In some implementations, the convolutional subnetwork includes residual connections, skip connections, or both. An example architecture of the convolutional subnetwork that includes both residual connections and skip connections is described below with reference to FIG. 5.

The neural network model 300 can generate audio output sequences conditioned on a neural network input 302. In some implementations, for example, the neural network model 300 is a generic neural network model for all users, and the neural network input 302 is a context vector for a particular user.

In other implementations, the neural network input 302 includes one or more global features, i.e., one or more features that are the same throughout the entire audio output sequence. As an example, the neural network model 300 can generate audio output samples conditioned on the context of the communication session between two or more users. The context of the communication session might be a business meeting, a band rehearsal, or a video game session. When the audio output samples are conditioned on a business meeting context, for example, the neural network model might be more likely to generate audio output samples that have some relation to business. As another example, the context of the communication session might be a band rehearsal. When the audio output samples are conditioned on a band rehearsal context, the neural network model might be more likely to generate musical sounds rather than regular speech. The audio output samples could even be conditioned on a particular genre of music. In such a case, the neural network model might be more likely to output a particular subset of musical sounds associated with that genre.

Generally, the audio output sequences are conditioned on the neural network input by conditioning the activation function of some or all of the convolutional layers in the convolutional subnetwork. That is, the output of the activation function and, accordingly, the output of the convolutional layer, is dependent not only on the output of the convolution performed by the layer but also on the neural network input.

Conditioning an activation function of a convolutional layer on the neural network input will be described in more detail below with reference to FIG. 5.

The convolutional subnetwork 310 can be trained on raw or compressed and/or companded audio data, for example waveforms of human speakers, music and so forth. In some implementations, the convolutional subnetwork is trained on a corpus of communications between the particular user modeled by the neural network model and the user that locally implements the neural network model. In other implementations, the convolutional subnetwork 310 is trained on a corpus of communications between the particular user modeled by the neural network model and a number of other people. In other implementations, the convolutional subnetwork 310 is trained on a corpus of generic conversations, e.g., on a corpus of conversations between people not including the person to be modeled. In such implementations, the convolutional subnetwork 310 is conditioned on a context vector for the person to be modeled.

At training time, i.e., during the training of the convolutional subnetwork 310 and the output layer 320 to determine trained values of the filters of the convolutional layers and any other parameters of the system, the system can generate the conditional predictions for all time steps in parallel because all time steps of the ground truth output that should be generated by the system are known. Generally, the system can perform the training to determine the trained values of the parameters using conventional supervised learning techniques, e.g., a stochastic gradient descent with backpropagation based technique. As described above, because of this parallelization and the use of causal convolutional layers, the system does not need as many computational resources to train as other systems, e.g., those that include recurrent neural network layers, resulting in a reduced training time.

Figure 4:
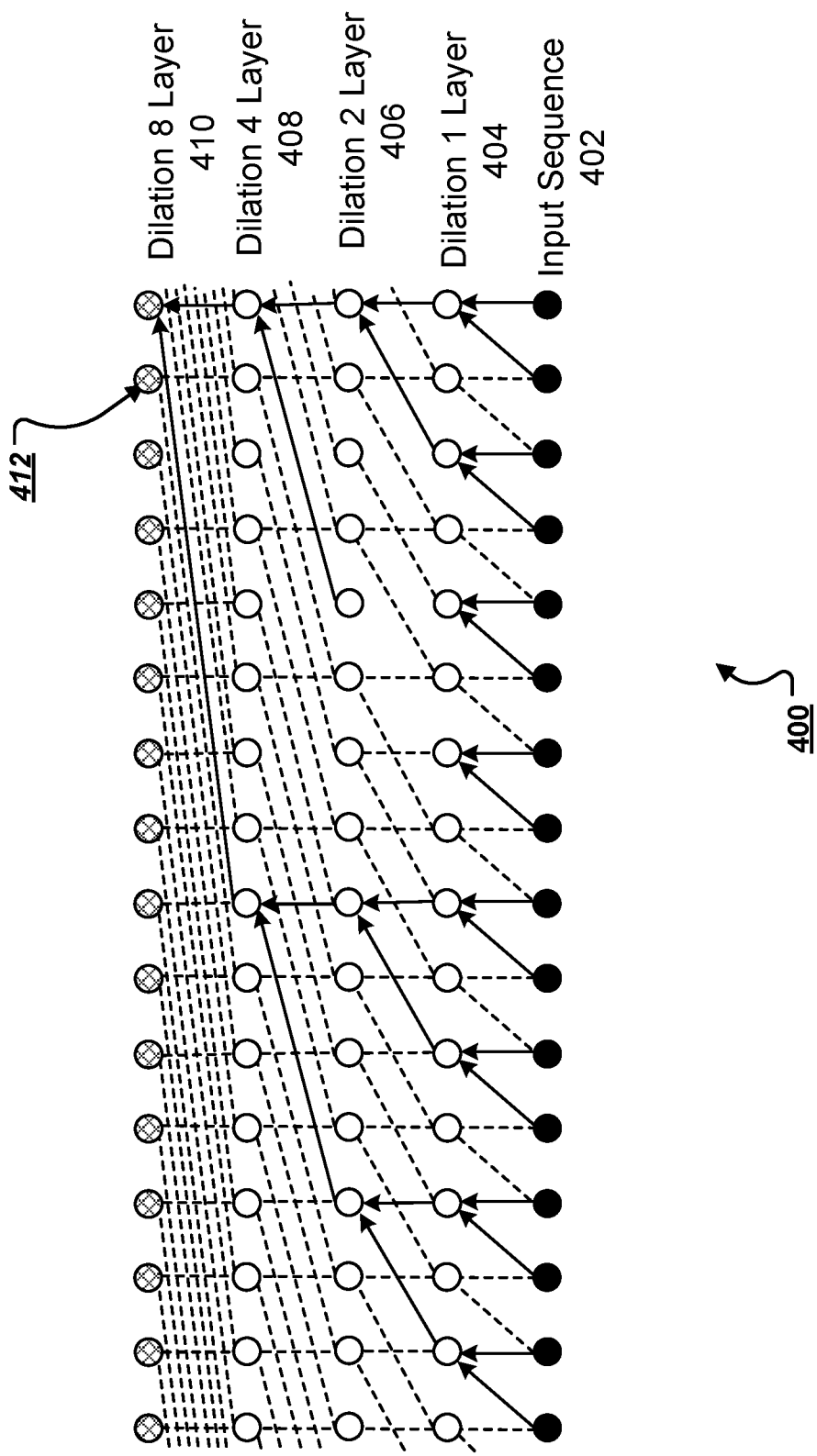
FIG. 4 is a diagram of an example block of dilated causal convolutional layers.

FIG. 4 is a diagram of an example block 400 of dilated causal convolutional layers. In particular, the example block includes a dilated causal convolutional layer 404 with dilation one, a dilated causal convolutional layer 406 with dilation two, a dilated causal convolutional layer 408 with dilation four, and a dilated causal convolutional layer 410 with dilation eight.

The block 400 of dilated causal convolutional layers are operating on a current input sequence 402 to generate an output sequence. In particular, FIG. 4 uses bold arrows to show how the block generates the output 412 that is the output at the time step that is currently the last time step in the current input sequence 402 and the output sequence.

As can be seen in FIG. 4, because each layer in the block is a causal convolutional layer, the output 412 depends only on outputs that are at the last current time step or time steps before the last current time step in the various sequences operated on by the layers in the block.

Additionally, the layers in the block 400 are arranged in order of increasing dilation, with the first layer in the block, i.e., dilated causal convolutional layer 404, having dilation one and the last layer in the block, i.e., dilated causal convolutional layer 404, having dilation eight. In particular, because the dilated causal convolutional layer 404 has dilation one, the filter of the layer 404 is applied to adjacent inputs in the current input sequence 402. Because the dilated causal convolutional layer 406 has dilation two, the filter of the layer 406 is applied to outputs that are separated by one output in the output sequence generated by the layer 404. Because the dilated causal convolutional layer 408 has dilation four, the filter of the layer 408 is applied to outputs that are separated by three outputs in the output sequence generated by the layer 406. Because the dilated causal convolutional layer 410 has dilation eight, the filter of the layer 410 is applied to outputs that are separated by seven outputs in the output sequence generated by the layer 408.

Figure 5:
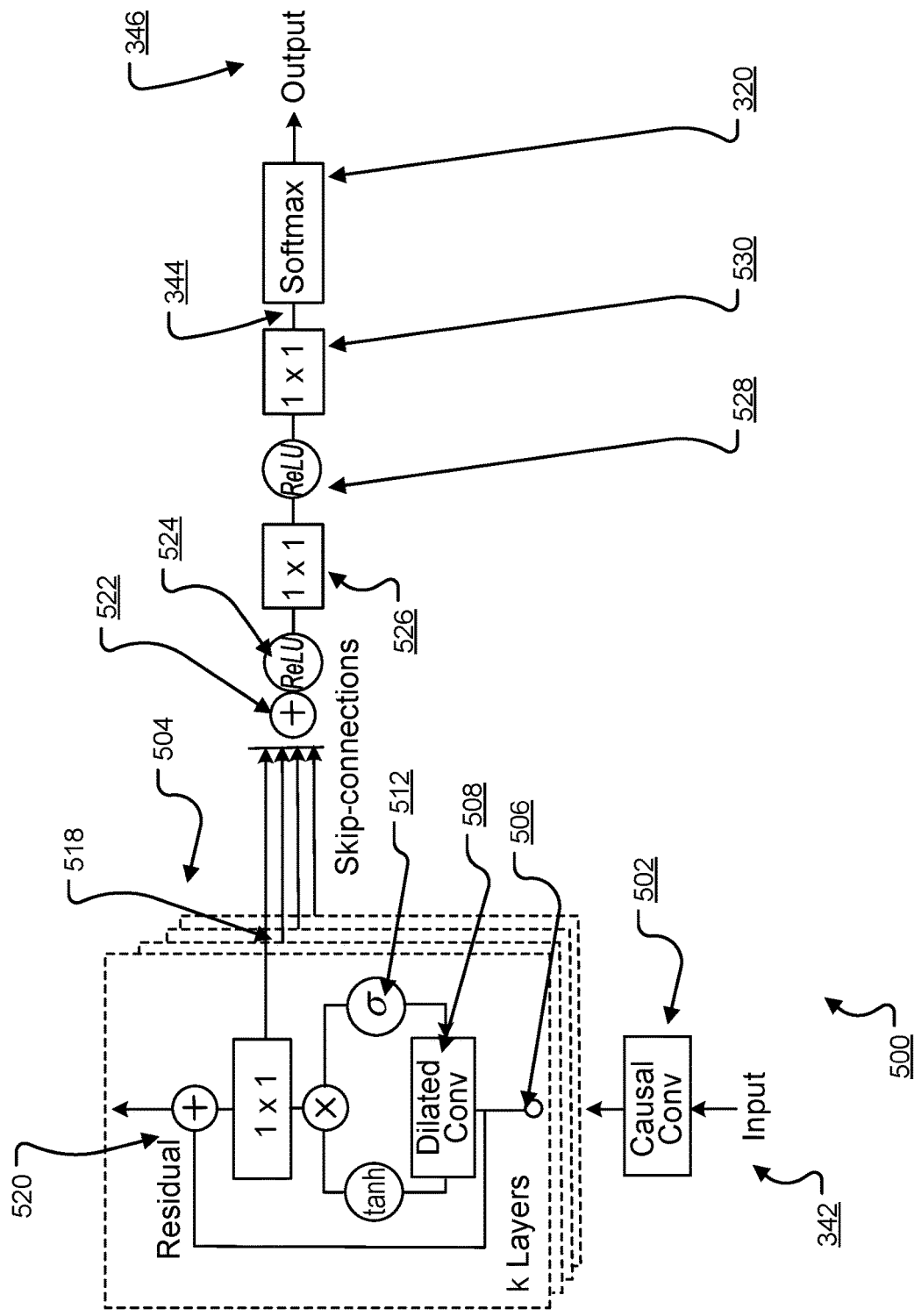
FIG. 5 is a diagram of an example architecture for a convolutional subnetwork.

FIG. 5 is a diagram of an example architecture 500 for the convolutional subnetwork 310 of FIG. 3. As described above, in the example architecture 500, the dilated causal convolutional layers that are in the convolutional subnetwork have residual connections and skip connections.

In particular, in the architecture 500, the convolutional subnetwork 310 includes a causal convolutional layer 502 that processes the audio input sequence 342, i.e., by applying a causal convolution to the audio input sequence 342.

The convolutional subnetwork 310 then processes the output of the causal convolutional layer 502 through a stack of dilated causal convolutional layers.

Each dilated causal convolutional layer 504 in the stack applies a dilated causal convolution 508 to a layer input 506. As described above, in some implementations, the dilated causal convolutional layers in the stack are arranged in blocks, with the dilation of the dilated causal convolutions applied by each layer increasing within a given block and then restarting at the initial value for the first layer in the next block.

In some implementations, the dilated causal convolutional layers in the stack have a gated activation function in which the output of an element-wise non-linearity, i.e., of a conventional activation function, is element-wise multiplied by a gate vector. In some of these implementations, the dilated causal convolution 508 performs two dilated causal convolutions on the layer input 506—a first dilated causal convolution between a main filter for the layer 504 and the layer input 506 and another dilated causal convolution between a gate filter for the layer 504 and the layer input 506. In others of these implementations, the dilated causal convolution 508 is a single dilated causal convolution and half of the output of the single convolution is provided as the output of the dilated causal convolution between the main filter for the layer 504 and the layer input 506 and the other half of the output of the single convolution is provided as the output of the dilated causal convolution between the gate filter for the layer 504 and the layer input 506.

The dilated causal convolutional layer 504 then determines the output of the activation function of the layer 504 using the outputs of the dilated causal convolution.

The audio output sequence is conditioned on a neural network input, e.g., a context vector for a particular user or a context vector for the subject of the communication session. In particular, the non-linear function and the gating function each take as input a combination of the corresponding dilated convolution output and an input generated from the neural network input.

More specifically, when the neural network input includes global features and is therefore the same for all of the time steps in the sequence, the element-wise non-linearity is tan h and the element-wise gating function is the sigmoid function, and the output of the activation function z for the layer k satisfies:

$$z = \tanh(W_{f,k} * x + V_{f,k}^T h) \odot \sigma(W_{g,k} * x + V_{g,k}^T h)$$

where $V_{f,k}^T$ is a main learnable linear projection (of h to the main component of the activation function) for the layer k, h is the neural network input, and $V_{g,k}^T$ is a gate learnable linear projection (of h to the gate component of the activation function) for the layer k.

Because the architecture 500 includes skip connections and residual connections for the dilated causal convolutional layers, the layer 504 then performs a 1×1 convolution 516 on the activation function output.

The layer 504 provides the output of the 1×1 convolution as the skip output 518 of the layer and adds the residual, i.e., the layer input 506, and the output of the 1×1 convolution to generate the final output 520 of the layer 504. The convolutional subnetwork 310 then provides the final output 520 as the layer input to the next dilated convolutional layer in the stack.

In some implementations, the layer 504 performs two 1×1 convolutions on the activation function output, one with a residual filter and the other with a skip filter. In these implementations, the layer 504 provides the output of the convolution with the skip filter as the skip output 518 of the layer and adds the residual and the output of the 1×1 convolution with the residual filter to generate the final output 520 of the layer 504.

The convolutional subnetwork 310 then provides the final output 520 as the layer input to the next dilated convolutional layer in the stack. For the last layer in the stack, because there is no next layer, the convolutional subnetwork 310 can either discard the final output 520 generated by the last layer or can refrain from computing a final output, i.e., can refrain from performing the 1×1 convolution and the residual sum for the last layer in the stack.

Once the processing of all of the layers 504 in the stack of dilated convolutional layers has been completed, the convolutional subnetwork 310 sums 522 the skip outputs generated by the layers 504. The convolutional subnetwork 310 can then apply one or more non-linear functions, one or more 1×1 convolutions, or both to the sum 522 to generate the alternative representation 344. In particular, in the example of FIG. 5, the convolutional subnetwork 310 applies an element-wise non-linearity 524, e.g., a ReLU, followed by a 1×1 convolution 526, followed by another element-wise non-linearity 528, and followed by a final 1×1 convolution 530, to generate the alternative representation 344.

As described above, the output layer 320 then processes the alternative representation 344 to generate the score distribution 346.

While this specification describes audio prediction, the same techniques can be used to predict video, e.g., during a video conference or a gaming session between multiple users. An example of a neural network that can be used to predict video is the Video Pixel Network, described in Nal Kalchbrenner et al., *Video Pixel Networks*, arXiv: 1610.00527v1 [cs.CV], and incorporated herein by reference.

Embodiments of the subject matter and the actions and operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. The computer storage medium can be or be part of a machine-readable storage device, a machine-readable storage substrate, a random or serial access memory device, or a combination of one or more of them. A computer storage medium is not a propagated signal.

The term "data processing apparatus" encompasses all kinds of apparatus, devices, and machines for processing data, including by way of example a programmable processor, a computer, or multiple processors or computers. Data processing apparatus can include special-purpose logic circuitry, e.g., an FPGA (field programmable gate array), an ASIC (application-specific integrated circuit), or a GPU (graphics processing unit). The apparatus can also include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, an engine, a script, or code, can be written in any form of programming language, including compiled or interpreted languages, or declarative or procedural languages; and it can be deployed in any form, including as a stand-alone program or as a module, component, engine, subroutine, or other unit suitable for executing in a computing environment, which environment may include one or more computers interconnected by a data communication network in one or more locations.

A computer program may, but need not, correspond to a file in a file system. A computer program can be stored in a portion of a file that holds other programs or data, e.g., one or more scripts stored in a markup language document, in a single file dedicated to the program in question, or in multiple coordinated files, e.g., files that store one or more modules, sub-programs, or portions of code.

The processes and logic flows described in this specification can be performed by one or more computers executing one or more computer programs to perform operations by operating on input data and generating output. The processes and logic flows can also be performed by special-purpose logic circuitry, e.g., an FPGA, an ASIC, or a GPU, or by a combination of special-purpose logic circuitry and one or more programmed computers.

Computers suitable for the execution of a computer program can be based on general or special-purpose microprocessors or both, or any other kind of central processing unit. Generally, a central processing unit will receive instructions and data from a read-only memory or a random access memory or both. The essential elements of a computer are a central processing unit for executing instructions and one or more memory devices for storing instructions and data. The central processing unit and the memory can be supplemented by, or incorporated in, special-purpose logic circuitry.

Generally, a computer will also include, or be operatively coupled to receive data from or transfer data to one or more mass storage devices. The mass storage devices can be, for example, magnetic, magneto-optical, or optical disks, or solid state drives. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

To provide for interaction with a user, embodiments of the subject matter described in this specification can be implemented on, or configured to communicate with, a computer having a display device, e.g., a LCD (liquid crystal display) monitor, for displaying information to the user, and an input device by which the user can provide input to the computer, e.g., a keyboard and a pointing device, e.g., a mouse, a trackball or touchpad. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser, or by interacting with an app running on a user device, e.g., a smartphone or electronic tablet. Also, a computer can interact with a user by sending text messages or other forms of message to a personal device, e.g., a smartphone that is running a messaging application, and receiving responsive messages from the user in return.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what is being or may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claim may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A system comprising:
  a first user device configured to transmit audio data to and receive audio data from one or more other user devices, wherein the first user device is configured to perform operations comprising:
  initiating a communication session between a first user of the first user device and a second user of a second user device;
  obtaining a neural network model of the second user, wherein the neural network model is trained to repeatedly perform operations comprising:
    receiving audio input samples of communication between the first user and the second user during the communication session, and
    generating, conditioned on the audio input samples received up to a current time step, an audio output sample predicted to be communicated by the second user at a next time step; and
  during the communication session, repeatedly (i) providing received audio input samples as input to the neural network model and (ii) playing audio output samples generated by the neural network model in place of received audio input samples communicated by the second user before the received audio input samples are ready to be played.

2. The system of claim 1, wherein the neural network model is a convolutional neural network model.

3. The system of claim 1, wherein the neural network model is trained on a corpus of communications between the first user and the second user.

4. The system of claim 1, wherein the neural network model is trained to generate the audio input samples conditioned on a context vector for the second user, wherein the context vector defines a context of the communications between the first user and the second user, and wherein the operations further comprise obtaining the context vector for the second user and conditioning the neural network model on the context vector.

5. The system of claim 4, wherein the neural network model is trained on a corpus of communications between the second user and a plurality of different users.

6. The system of claim 1, wherein generating an audio output sample for a respective time step comprises:
  generating a probability distribution over a set of possible audio output samples for the time step; and
  selecting an audio output sample corresponding to a highest probability in the probability distribution.

7. The system of claim 6, wherein the set of possible audio output samples includes one or more samples representing silence.

8. The system of claim 1, wherein generating an audio output sample for a respective time step comprises:
  generating a probability distribution over a set of possible audio output samples for the time step; and
  determining that none of the probabilities in the distribution meet a predetermined threshold,
  wherein the first user device is further configured to perform operations comprising:
    playing a received audio input sample communicated by the second user at the time step instead of the audio output sample generated by the neural network model, and
    resuming playing audio output samples generated by the neural network model at a next time step.

9. The system of claim 1, wherein the first user device is further configured to perform operations comprising:
  determining that an audio output sample predicted to be communicated by the second user at a respective time step during the communication session does not correspond to a received audio input sample for the time step;
  playing the received audio input sample for the time step; and
  resuming playing audio output samples generated by the neural network model at a next time step.

10. The system of claim 9, wherein a rate of the played audio input sample is faster than a rate of the received audio input sample.

11. A method comprising:
  initiating a communication session between a first user of a first user device and a second user of a second user device, wherein the first user device is configured to transmit audio data to and receive audio data from one or more other user devices;
  obtaining, by the first user device, a neural network model of the second user, wherein the neural network model is trained to repeatedly:
    receive audio input samples of communication between the first user and the second user during the communication session, and
    generate, conditioned on the audio input samples received up to a current time step, an audio output sample predicted to be communicated by the second user at a next time step; and
  during the communication session, repeatedly (i) providing, by the first user device, received audio input samples as input to the neural network model and (ii) playing, by the first user device, audio output samples generated by the neural network model in place of received audio input samples communicated by the second user before the received audio input samples are ready to be played.

12. The method of claim 11, wherein the neural network model is a convolutional neural network model.

13. The method of claim 11, wherein the neural network model is trained on a corpus of communications between the first user and the second user.

14. The method of claim 11, wherein the neural network model is trained to generate the audio input samples conditioned on a context vector for the second user, wherein the context vector defines a context of the communications between the first user and the second user, and wherein the method further comprises obtaining the context vector for the second user and conditioning the neural network model on the context vector.

15. The method of claim 14, wherein the neural network model is trained on a corpus of communications between the second user and a plurality of different users.

16. The method of claim 11, wherein generating an audio output sample for a respective time step comprises:
  generating a probability distribution over a set of possible audio output samples for the time step; and
  selecting an audio output sample corresponding to a highest probability in the probability distribution.

17. The method of claim 16, wherein the set of possible audio output samples includes one or more samples representing silence.

18. The method of claim 11, wherein generating an audio output sample for a respective time step comprises:
  generating a probability distribution over a set of possible audio output samples for the time step; and
  determining that none of the probabilities in the distribution meet a predetermined threshold,
  wherein the first user device is further configured to:
    play a received audio input sample communicated by the second user at the time step instead of the audio output sample generated by the neural network model, and
    resume playing audio output samples generated by the neural network model at a next time step.

19. The method of claim 11, wherein the first user device is further configured to perform operations comprising:
  determining that an audio output sample predicted to be communicated by the second user at a respective time step during the communication session does not correspond to a received audio input sample for the time step;
  playing the received audio input sample for the time step; and
  resuming playing audio output samples generated by the neural network model at a next time step.

20. The method of claim 19, wherein a rate of the played audio input sample is faster than a rate of the received audio input sample.

* * * * *